United States Patent Office 3,320,293
Patented May 16, 1967

3,320,293
ORGANIC COMPOUNDS CONTAINING
COVALENT GOLD
Charles E. Coffey, Wilmington, Del., assignor to E. I. du Pont de Nemours and Company, Wilmington, Del., a corporation of Delaware
No Drawing. Filed Oct. 5, 1962, Ser. No. 228,732
11 Claims. (Cl. 260—429)

The present invention relates to new compounds containing covalent gold and to a process for their manufacture.

The compounds of the present invention have the following structure $$(R_3MAu)_nY(CO)_zR'_x$$

where R represents at least one organic radical of up to 12 carbon atoms; M is phosphorus or arsenic; Y is manganese, iron, cobalt, molybdenum, tungsten, or rhenium; $n$ is 1 or 2; R' is cyclopentadienyl, $R_3P$— or $R_3As$—; $z$ is 1 to 5 inclusive, and preferably 3 to 5; and $x$ is 0 or 1. When Y is tungsten or molybdenum $x$ is 1 and R' is cyclopentadienyl. The structure of these compounds is such that the electron shells of Y are filled with electrons shared from $R_3MAu$, CO and R' groups until such shells of Y have the same number of electrons as the shells of the inert gas next higher than Y in the Periodic Table. A $R_3MAu$ group furnishes one electron, a CO group two electrons, a cyclopentadienyl group five electrons, and a $R_3P$— or $R_3As$— two electrons. Thus the sum of electrons furnished by $R_3MAu$, CO, and R' equals the number necessary to fill the electron shells to the same extent as those in the shells of the inert gas next higher in the Periodic Table to Y.

The groups attached to the phosphorus or arsenic atoms, that is, the radicals represented by R in the above formula, can be the same or different, and can be, for example, aryl such as phenyl or naphthyl; substituted aryl such as chlorophenyl, methylphenyl, bromophenyl, 1-methylnaphthyl, 2-methylnaphthyl, nitrophenyl and many others; aralkyl such as phenylethyl; an alkyl such as methyl, ethyl, propyl, hexyl, octyl, decyl, dodecyl; cycloalkyl such as cyclopentyl, cyclohexyl, cyclooctyl, cyclodecyl, and cyclododecyl; substituted cycloalkyl groups such as methylcyclohexyl and chlorocyclohexyl; and alkoxy groups such as methoxy, ethoxy, butoxy, dodecoxy, and substituted alkoxy groups such as chloroethoxy, cyanoethoxy; and aryloxy such as phenoxy. The R groups are preferably hydrocarbon and free of aliphatic unsaturation.

Examples of compounds of this invention are the following where $C_5H_5$ represents a cyclopentadienyl radical $\pi$ bonded to Y and $C_6H_5$ a phenyl radical:

$(CH_3)_3PAuCo(CO)_4$
$(C_2H_5)_3AsAuW(CO)_3C_5H_5$
(n-dodecyl)$_3PAuMn(CO)_5$
$[(C_6H_5CH_2)_3PAu]_2Fe(CO)_4$
$(C_6H_5)_3PAuMn(CO)_5$
$(C_6H_5)_3AsAuCo(CO)_3P(C_6H_5)_3$
(cyclohexyl)$_3PAuRe(CO)_5$
(cyclopentyl)$_3PAuMo(CO)_3C_5H_5$
$(C_6H_5)_3PAuFe(CO)_2C_5H_5$
$(C_6H_5)_3PAuCo(CO)_3As(C_6H_5)_3$
$(CH_3O)_3PAuMn(CO)_5$
$(CH_3)_2C_6H_5)PAuMn(CO)_5$
$(C_6H_5)_3PAuRe(CO)_5$ The process for making the compounds of the present invention comprises mixing, in solvent, a trisubstituted phosphine or arsine gold chloride of the formula $R_3MAuCl$ with an anion of a metal carbonyl of the formula $Y(CO)_zR'_x{}^{-n}$ wherein R, M, Y, R', $z$, $x$ and $n$ have the significance indicated hereinbefore.

The trisubstituted phosphine gold chloride or tri-substituted arsine gold chloride is prepared by the method described in Accad. dei Lincei Rend. 17, 853 (1908).

The metal carbonyl anions used can be prepared by the addition of electrons from an external source to a metal carbonyl. The external source of electrons is most conveniently supplied by a base such as sodium amalgam, sodium hydroxide, pyridine, sodium borohydride and many others. For example, $NaCo(CO)_4$ is prepared as described in the Journal of the American Chemical Society 74, 1216 (1952), and $NaMn(CO)_5$ is prepared as described in Zeitschrift fur Naturforschung 13b, 339 (1958).

Anions of tungsten and molybdenum carbonyls are very difficult to prepare unless substituted with a cyclopentadienyl radical, thus the compounds of the present invention must include a cyclopentadienyl radical if tungsten or moylbdenum are a part of the anion.

The reaction between the trisubstituted phosphine or arsine gold chloride and the carbonyl anion is effected by mixing the two in a solvent, usually at a temperature ranging from about $-80°$ C. to about $80°$ C. Below $-80°$ C. the reaction is so slow as to be inefficient and above $80°$ C. some of the compounds begin to decompose. The preferred range is from about $-20°$ C. to about $50°$ C.

Solvents usable in the process of the present invention are selected from those which exert even a slight dissolving action on the reactants and which do not undergo reaction with the trisubstituted phosphine or arsine gold chloride or the anion of themsleves. Preferred solvents are alcohols such as methanol, ethanol, isopropanol, butanol, ethylene glycol; ethers such as tetrahydrofuran, diethyl ether, dimethoxyethane, 2,2'-dimethoxydiethyl ether, ethyl ether, dichlorodiethyl ether, diisopropyl ether, dioxane, dioxolane; amides such as N,N-dimethylformamide, N,N-dimethylacetamide, formamide, N-methylformamide, pyrrolidone, N-methylpyrrolidone and other solvents such as dimethyl sulfoxide.

The concentration of the reactants in the solvent is not important except as economic considerations dictate. Naturally, there will be enough solvent to allow mixing of the ingredients but it is not necessary that the ingredients go into solution completely. Generally, the concentration of reactants used will be as high as possible to reduce the cost of recovering and reusing the solvent used. The stoichiometric ratio of gold chloride compound to carbonyl anion is the most efficient ratio, however, other ratios can be used if the unreacted specie can be recovered for reuse economically.

Separation of the products of this invention can be effected by dilution of the solvent with water whereupon the product precipitates and the by-product sodium chloride is dissolved. If the solvent used is not water-miscible, it can be removed by distillation at reduced pressure. Purification can be effected by recrystallization from water-organic solvent mixtures.

The number of trisubstituted phosphine or arsine gold groups, that is, $R_3MAu$— groups, attached to the carbonyl anion is dependent on the valence of the anion. For example, where the valence is one, one group is attached as in triphenylphosphine gold cobalt tetracarbonyl. Where the valence is two, two groups are attached as in bis(triphenylphosphine gold)iron tetracarbonyl.

The compounds of the present invention are covalent, non-conductive, diamagnetic, soluble in organic solvents and insoluble in water. They decompose when heated to form metallic gold which can be deposited as it is formed on a desired substrate and, thus, the products of this invention find utility in gold plating, for example, glass, synthetic films and metals for use, for example, in mirrors and electronic condensers.

The invention is more thoroughly illustrated with the aid of the following examples. Parts where given are by weight.

*Example 1*

A solution of $NaMn(CO)_5$ (5 moles) in 50 liters of tetrahydrofuran is filtered under nitrogen into a solution of 5 moles of $(C_6H_5)_3PAuCl$ in 50 liters of tetrahydrofuran. The mixture is held at room temperature for 15 minutes, then 200 liters of water added and the resulting suspension held at 0° C. for 12 hours. The resulting brown solid is then filtered off and recrystallized from acetone-water and then from ethanol-water to give 4.0 moles of $(C_6H_5)_3PAuMn(CO)_5$ melting at 151° C. with decomposition.

*Analysis.*—Calcd. for $C_{23}H_{15}AuMnO_5P$: C, 42.2; H, 2.3; Au, 30.1. Found: C, 42.1; H, 2.2; Au, 30.1.

This compound is very soluble in chloroform and benzene, slightly soluble in hexane and methanol and insoluble in water. It is stable toward air, light, and water but is decomposed by mineral acid and mild oxidizing agents. It is diamagnetic (the molar magnetic susceptibility is $-250 \times 10^{-6}$ cgs. units) and a non-conductor in nitrobenzene.

*Example 2*

$Na_2Fe(CO)_4$ is prepared by adding $Fe(CO)_5$ (1.5 parts) to a solution of $NaBH_4$ (0.5 part) in 30 parts of the dimethyl ether of diethylene glycol. After gas evolution ceases, 8 parts of methanol is added to decompose excess $NaBH_4$. To this solution, after gas evolution ceases, is added a solution of 2 parts of $(C_6H_5)PAuCl$ in 20 parts tetrahydrofuran. The resulting solution is held at room temperature for 15 minutes and then 50 parts of methanol is added followed by just enough water to start recrystallization of the product. After cooling for 12 hours at 0° C. the solid is filtered off and washed with methanol to give an 80% yield of light yellow crystals. Recrystallization from acetone-water gives crystals melting with decomposition at 150° C. This compound is $$[(C_6H_5)_3PAu]_2Fe(CO)_4$$

*Analysis.*—Calcd. for $C_{40}H_{30}Au_2FeO_4P_2$: C, 44.2; H, 2.8; Au, 36.3. Found: C, 44.4; H, 2.9; Au, 35.8.

This solid is very soluble in chloroform and benzene, nearly insoluble in methanol and ethanol and insoluble in water. The compound is diamagnetic. The magnetic susceptibility is $-5.90 \times 10^{-6}$ cgs. units.

*Example 3*

$Co_2(CO)_8$ (0.151 part) is dissolved in 15 parts of tetrahydrofuran containing 0.5 part of pyridine. When gas evolution ceases the resulting solution is treated with a solution of 0.274 part of $(C_6H_5)_3PAuCl$ in 25 parts of tetrahydrofuran. The solution is kept at room temperature for one hour, then 100 parts of water are added, and the mixture is cooled to 0° C. and held at that temperature for 24 hours. The solid is filtered off, extracted with acetone and recrystallized from methanol to give a 60% yield of $(C_6H_5)_3PAuCo(CO)_4$ melting at 112–14° C. with decomposition.

*Analysis.*—Calcd. for $C_{22}H_{15}AuCoO_4P$: C, 41.9; H, 2.4. Found: C, 42.1; H, 2.55.

This compound is very soluble in benzene and chloroform, less soluble in methanol and insoluble in water. Solutions of the compound are decomposed by acids and oxidizing agents. The compound is diamagnetic. The magnetic susceptibility is $-320 \times 10^{-6}$ cgs. units.

$(C_6H_5)_3AsAuCo(CO)_4$ is made by the procedure above by using a molar equivalent of $(C_6H_5)_3AsAuCl$ as a replacement for the $(C_6H_5)_3PAuCl$.

*Example 4*

A solution of 1 part of bis(triphenylphosphine gold) iron tetracarbonyl in 10 parts of N,N-dimethylformamide is prepared in a glass vessel by the general procedure described in Example 2. The vessel is heated to reflux. Within one minute the inner glass surface of the vessel is coated with a smooth adherent gold coating up to the point of immersion in the solution.

*Example 5*

Equimolar quantities of $LiW(CO)_3C_5H_5$ prepared as described in Zeitschrift fur Anorg. and Allgem. Chem. 282, 47 (1955) and $(C_6H_5)_3PAuCl$ in tetrahydrofuran are mixed for 15 minutes at room temperature. The product, $(C_6H_5)_3PAuW(CO)_3C_5H_5$, is precipitated by adding water. The solid is recrystallized from acetone-water.

*Example 6*

Equimolar quantities of $NaMn(CO)_4P(C_6H_5)_3$ prepared as described in Zeitschrift fur Naturforschung 15B, 326 (1960) and $(C_6H_5)_3PAuCl$ dissolved in tetrahydrofuran are mixed for 15 minutes at room temperature. Water is added to the solution to precipitate a brown oily product having the structure $$(C_6H_5)_3PAuMn(CO)_4P(C_6H_5)_3$$

which is recrystallized by dissolving in acetone and precipitating with water.

I claim:
1. A compound of the structure

$$(R_3MAu)_nY(CO)_zR'_x$$

wherein R represents at least one organic radical of up to 12 carbon atoms, any aliphatic moiety represented by R being saturated; R' is a radical selected from the group consisting of cyclopentadienyl, $R_3P—$ and $R_3As—$; M is selected from the group consisting of phosphorus and arsenic; and Y is selected from the group consisting of manganese, iron, cobalt, molybdenum, tungsten and rhenium; wherein $n$ is 1 to 2 inclusive; $z$ is 1 to 5 inclusive; $x$ is a cardinal number of up to 1; the sum of $n$, $z$ and $x$ is such that the number of electrons in the shells of Y is equal to the number of electrons in the shells of the next higher inert gas to Y in the Periodic Table; and when Y is selected from the group consisting of tungsten and molybdenum, $x$ is 1 and R' is cyclopentadienyl.

2. A compound of claim 1 wherein $z$ is 3 to 5.
3. A compound of the structure $$(R_3MAu)_nY(CO)_zR'_x$$

wherein R represents at least one hydrocarbon radical of up to 12 carbon atoms, any aliphatic hydrocarbon moiety represented by R being saturated; R' is a radical selected from the group consisting of cyclopentadienyl, $R_3P—$ and $R_3As—$; M is selected from the group consisting of phosphorous and arsenic; and Y is selected from the group consisting of manganese, iron, cobalt, molybdenum, tungsten and rhenium; wherein $n$ is 1 to 2 inclusive; $z$ is 3 to 5 inclusive; $x$ is a cardinal number of up to 1; the sum of $n$, $z$ and $x$ is such that the number of electrons in the shells of Y is equal to the number of electrons in the shells of the next higher inert gas to Y in the Periodic Table; and, when Y is selected from the group consisting of tungsten and molybdenum, $x$ is 1 and R' is cyclopenadienyl.

4. A compound of claim 3 wherein R is phenyl.
5. $(C_6H_5)_3PAuMn(CO)_5$.
6. $[(C_6H_5)_3PAu]_2Fe(CO)_4$.
7. $(C_6H_5)_3PAuCo(CO)_4$.
8. $(C_6H_5)_2PAuW(CO)_3C_5H_5$.
9. $(C_6H_5)_3PAuMn(CO)_4P(C_6H_5)_3$.
10. A process which comprises mixing, in solvent, a compound of the formula $R_3MAuCl$ with a carbonyl anion of the formula $Y(CO)_zR'_x^{-n}$ wherein R represents at least one organic radical of up to 12 carbon atoms, any aliphatic moiety represented by R being saturated; R′ is a radical selected from the group consisting of cyclopentadienyl, $R_3P-$ and $R_3As-$; M is selected from the group consisting of manganese, iron, cobalt, molybdenum, tungsten and rhenium; $n$ is 1 to 2 inclusive; $z$ is 1 to 5 inclusive; $x$ is a cardinal number of up to 1; and, when Y is selected from the group consisting of tungsten and molybdenum, $x$ is 1 and R′ is cyclopentadienyl, said carbonyl anion being formed by the reaction of one of the group consisting of manganese, iron, cobalt, molybdenum, tungsten and rhenium carbonyls with base.

11. A process of claim 10 wherein the reaction is carried out at a temperature of about from $-20$ to $+50°$ C.

No references cited.

TOBIAS E. LEVOW, *Primary Examiner.*

A. P. DEMERS, *Examiner.*

UNITED STATES PATENT OFFICE
CERTIFICATE OF CORRECTION

Patent No. 3,320,293                                    May 16, 1967

Charles E. Coffey

It is hereby certified that error appears in the above numbered patent requiring correction and that the said Letters Patent should read as corrected below.

Column 4, line 72, for "$(C_6H_5)_2PAuW(CO)_3C_5H_5$" read -- $(C_6H_5)_3PAuW(CO)_3C_5H_5$ --.

Signed and sealed this 28th day of November 1967.

(SEAL)
Attest:

Edward M. Fletcher, Jr.
Attesting Officer

EDWARD J. BRENNER
Commissioner of Patents